(12) United States Patent
Cooper

(10) Patent No.: US 7,325,680 B2
(45) Date of Patent: Feb. 5, 2008

(54) NET HOLDER FOR BOATS

(76) Inventor: Curtis Cooper, 412 NE. 13th Ave., Gainesville, FL (US) 32601

( * ) Notice: Subject to any disclaimer, the term of this patent is extended or adjusted under 35 U.S.C. 154(b) by 176 days.

(21) Appl. No.: 10/252,853

(22) Filed: Sep. 23, 2002

(65) Prior Publication Data

US 2004/0055912 A1 Mar. 25, 2004

(51) Int. Cl.
*B65D 85/00* (2006.01)

(52) U.S. Cl. .............. 206/315.11; 220/4.22; 220/4.23; 220/827

(58) Field of Classification Search .......... 206/315.11; 43/541, 7; 114/343, 255; 220/4.21, 4.22, 220/4.23, 4.24, 4.25, 827, 830, 833, DIG. 13
See application file for complete search history.

(56) References Cited

U.S. PATENT DOCUMENTS

| | | | | |
|---|---|---|---|---|
| 435,211 | A * | 8/1890 | Darrah | 43/56 |
| 657,267 | A * | 9/1900 | Epstein | 206/101 |
| 1,925,330 | A | 9/1933 | Leisner | |
| 2,591,891 | A | 4/1952 | Thorsen | |
| 2,795,888 | A | 6/1957 | Garland | |
| 2,905,356 | A * | 9/1959 | Jerome | 220/323 |
| 3,079,156 | A | 2/1963 | Baukney | |
| 3,277,599 | A * | 10/1966 | Griffeth | 43/55 |
| 3,343,838 | A | 9/1967 | Baukney | |
| 3,604,706 | A * | 9/1971 | Baukney | 473/554 |
| 4,004,625 | A * | 1/1977 | Zietlow, Jr. | 383/40 |
| 4,007,930 | A | 2/1977 | Straus | |
| 4,026,230 | A * | 5/1977 | Wilford | 114/104 |
| 4,179,054 | A | 12/1979 | Bredehoeft et al. | |
| 4,189,054 | A * | 2/1980 | Liu et al. | 220/4.23 |
| 4,294,299 | A * | 10/1981 | Dorsen et al. | 150/123 |
| 4,598,824 | A * | 7/1986 | Long et al. | 206/308.3 |
| 4,653,716 | A | 3/1987 | Sakaguchi | |
| 4,723,695 | A | 2/1988 | Farber | |
| 4,724,791 | A * | 2/1988 | McSorley | 114/343 |
| 4,843,994 | A * | 7/1989 | Wilson et al. | 114/219 |
| 4,890,731 | A * | 1/1990 | Mroz | 206/315.9 |
| 4,892,241 | A * | 1/1990 | Mavrakis | 224/640 |
| 4,980,988 | A | 1/1991 | Whitman | |
| 5,312,081 | A | 5/1994 | Martin | |
| 5,613,459 | A * | 3/1997 | Remy | 114/55.5 |
| 5,894,931 | A * | 4/1999 | Dunn | 206/555 |
| 6,035,800 | A * | 3/2000 | Clifford | 114/347 |
| 6,186,349 | B1 * | 2/2001 | Tempongko | 220/4.22 |
| 6,206,225 | B1 * | 3/2001 | Fox | 220/501 |

* cited by examiner

*Primary Examiner*—Jila M. Mohandesi
(74) *Attorney, Agent, or Firm*—Arthur G. Yeager

(57) ABSTRACT

A net holder for carrying a landing net has an upper housing in the form of a channel member with a downwardly disposed opening hinged at its rearward portion to the rearward portion of a lower housing in the form of a channel member slightly narrower than the upper housing with an upwardly disposed opening. The hinge is spring-biased to force the upper housing downwardly onto and over the lower housing to enclose a landing net therein. The front of the lower housing has a notch into which a handle of a net can be inserted and thereby secured. The holder can be attached to the inside or outside of a boat by any appropriate fastener.

9 Claims, 2 Drawing Sheets

NET HOLDER FOR BOATS

CROSS-REFERENCE TO RELATED APPLICATION

Not Applicable.

STATEMENT REGARDING FEDERALLY SPONSORED RESEARCH OR DEVELOPMENT

Not Applicable.

REFERENCE TO A MICROFICHE APPENDIX

Not Applicable

BACKGROUND OF THE INVENTION

1. Field of the Invention

The present invention relates to fishing net holders and particularly to net holders adjustable in size and adapted to be attached to boats.

2. Relevant Art

A wide variety of holders exist for holding fishing nets, particularly landing nets. What is needed is a net holder that is adjustable in size to accommodate nets of varying loop diameters.

BRIEF SUMMARY OF THE INVENTION

In one aspect of the present invention there is provided a net holder for carrying a landing net comprising an upper housing formed as a channel member with a front and rear portion and a downwardly disposed elongated opening, a lower housing formed as a channel member with a front and rear portion and an upwardly disposed elongated opening, and means for pivotally securing the rear portions of the upper and lower housing together. The upper housing is movable upwardly to an open position to allow a net to be placed in the lower housing and movable downwardly to a closed position to enclose a net between the upper and lower housings. The means for pivotally securing includes biasing means for forcing the upper housing downwardly to the closed position. The front portion of the upper housing is formed to rest against a handle of a net carried in the lower housing and includes means for securing a handle of a net carried in the lower housing to the lower housing. The channel member of the upper housing is wider than the channel member of the lower housing to provide for the upper housing fitting down over the lower housing when the upper housing is in the closed position. There is also attaching means for attaching the net holder to a hull of a boat, the attaching means including adjustment means for selectively adjusting the net holder in a plurality of positions.

The upper housing includes a pair of spaced side walls each having an upper and lower edge portion and an elongate upper wall having a front portion and a rear portion and spaced side edge portions, the side edge portions of the upper wall joined to the upper edge portions of the side walls. The lower housing includes a pair of spaced side walls each having an upper and lower edge portion and an elongate lower wall having a front portion and a rear portion and spaced side edge portions, the side edge portions of the lower walls joined along the lower edge portions of the side walls. The front portion of the upper housing is formed to rest against a handle of a net carried in the lower housing and has a notch formed therein for securing a handle of a net therein.

In another aspect of the present invention, there is provided a net holder for carrying a landing net comprising an upper section having a pair of spaced upper side walls each including a front and rear portion, the upper side walls defining an upper interior space therebetween, a lower section having a pair of spaced lower side walls each having a front and rear portion, the lower side walls defining a lower interior space therebetween, means for pivotally securing the rear portions of the sections together, the upper section being movable upwardly to an open position to allow a net to be placed in the lower interior space and downwardly to a closed position to enclose a net in the interior spaces. The means for pivotally securing includes biasing means for forcing the upper section downwardly to the closed position. There is also means for grasping the upper section for moving the upper section to the open position affixed adjacent the front portion of the upper section. Means for securing a net handle includes a wall member affixed between the front portions of the lower side walls, the wall member having a substantially vertically disposed notch formed therein for carrying a handle of a net thereby. The front portion of the upper section is formed to rest against a handle of a net carried in the lower interior portion and includes means for securing a handle of a net carried in the lower portion to the lower section. The upper side walls are spaced further apart than the lower side walls to provide for the upper section fitting down over the lower section when the upper section is in the closed position. Also included is attaching means for attaching the net holder to a hull of a boat. There is also included adjustment means for selectively adjusting said net holder in a plurality of positions.

BRIEF DESCRIPTION OF THE SEVERAL VIEWS OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

DETAILED DESCRIPTION OF THE INVENTION

Figure 1:
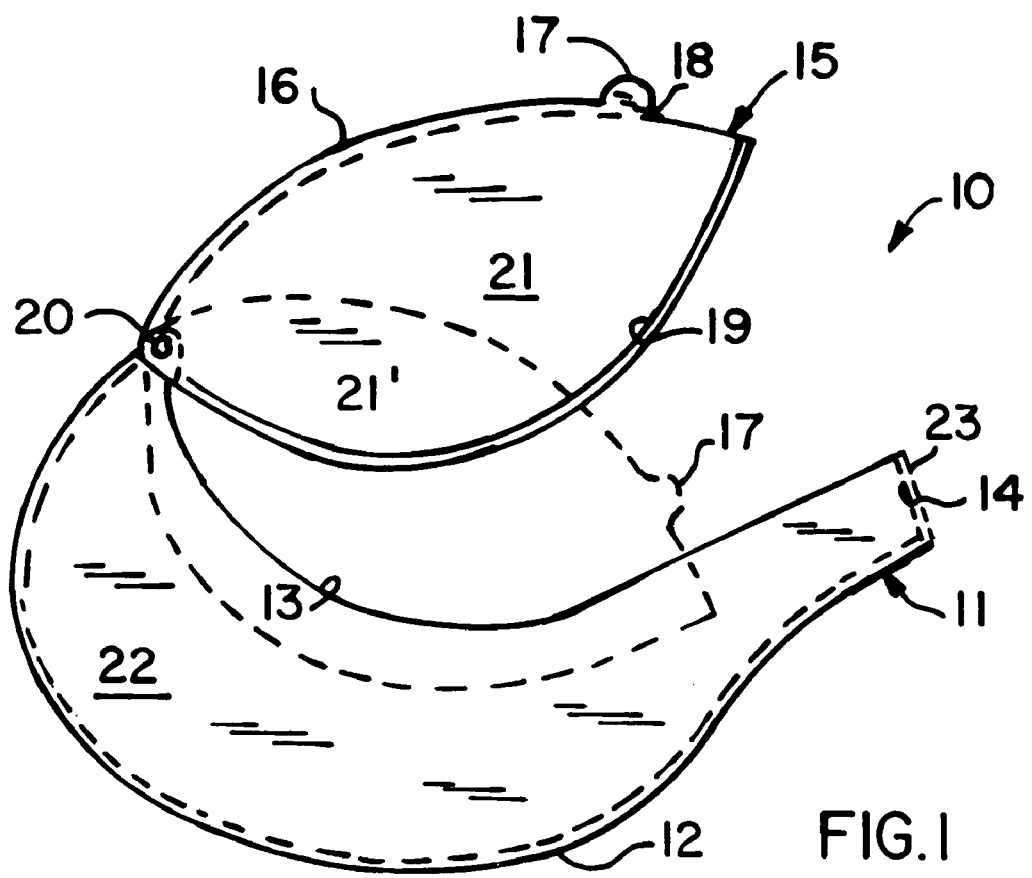
FIG. 1 is a side pictorial view of the landing net holder in accord with the present invention.

With respect to the drawings, an adjustable landing net holder in accord with the present invention is shown generally at 10 in FIG. 1. Holder 10 includes a lower net carrying member in the form of section or housing 11 having two generally planar and parallel side walls 22 and an elongate curved lower wall 12 forming an upwardly elongated opening or channel 13 (defining interior space 11') into which fits a fishing net.

An upper section or housing 15 includes an elongate curved upper wall 16 and two substantially planar and parallel side walls 21 forming a downwardly elongated opening or channel 19 (defining an interior space 15') which is sized wider than lower housing 11 in order to fit down over lower section 15 thus enclosing a net in the interior space defined by walls 21 and 22. Outwardly flared lower portions 21' prevent binding and provide for a smoother fit between the two housings 11 and 15.

The sections 11 and 15 fit together via a pivot mounting at hinge 20. Hinge 20 is preferably connected to one end of housing 15 via spring 20' and connected at the other end to housing 11 with two connecting means 20" as understood in the art. The spring is used to force upper section 15 downwardly from an open position (shown in solid line) to a closed position (shown in broken line).

Figure 2:
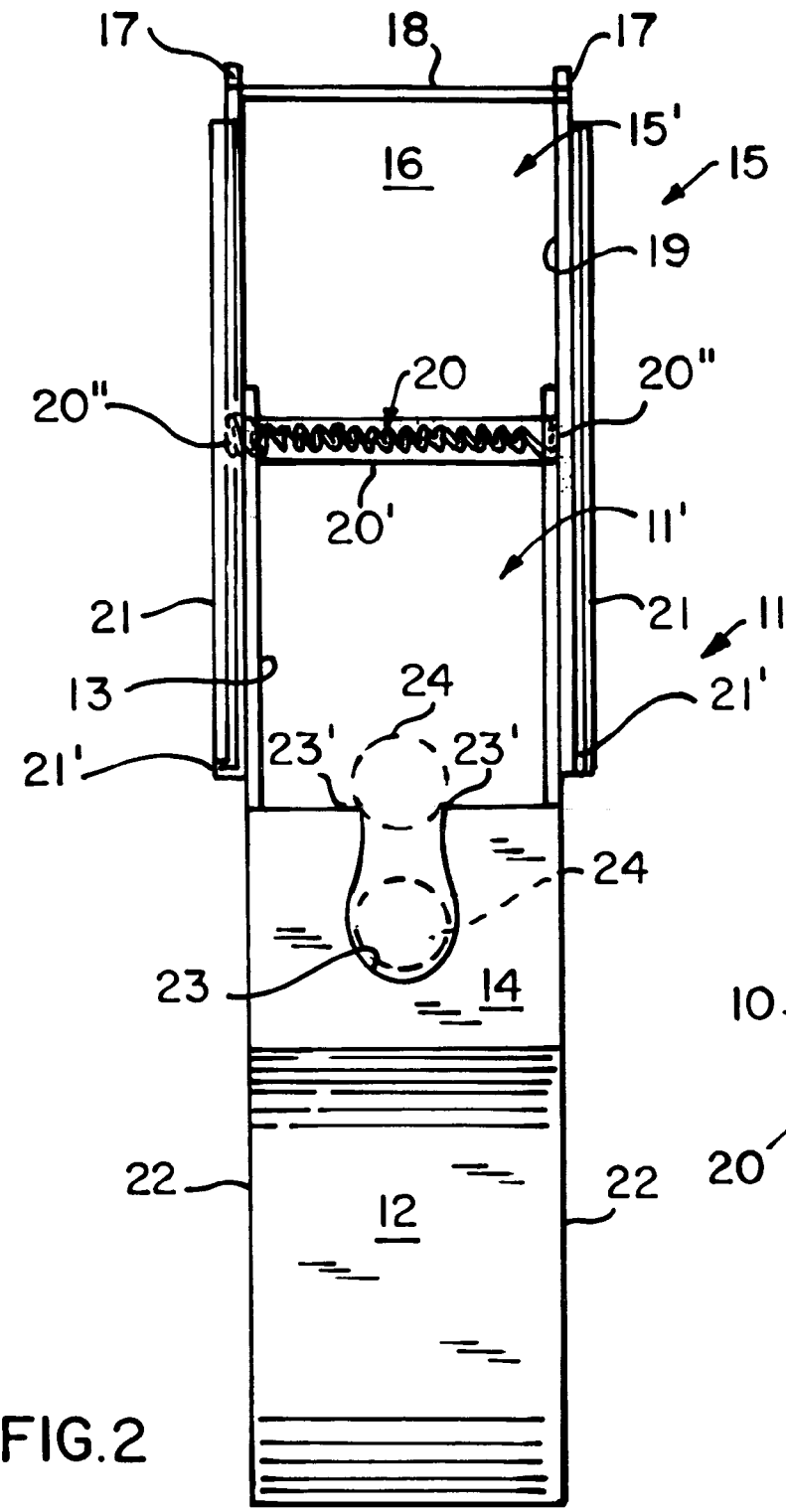
FIG. 2 is a front pictorial of the net holder of FIG. 1.

With reference also to FIG. 2, the forward end of upper section 15 is cut away to form ledge 18 which will rest downwardly on handle 24 (FIG. 3) of an enclosed fishing net thus substantially enclosing a net therein. A net can be withdrawn by simply pulling it out thus forcing the upper housing 15 upwardly. Finger ears or ledges 17 provide a grasping point to open the holder 10 if desired.

The forward end of lower section 11 includes a neck portion having an end wall 14 into which is cut a notch 23 designed to secure a net handle 24 therein. Wall 14 is preferably an integral extension of lower wall 12. The material used in the holder 10 is plastic and sufficiently resilient to allow net handle 24 to be forced downwardly from the upper unsecured position to the lower secured position into notch 23 by slight deformation of shoulders 23'.

Figure 3:
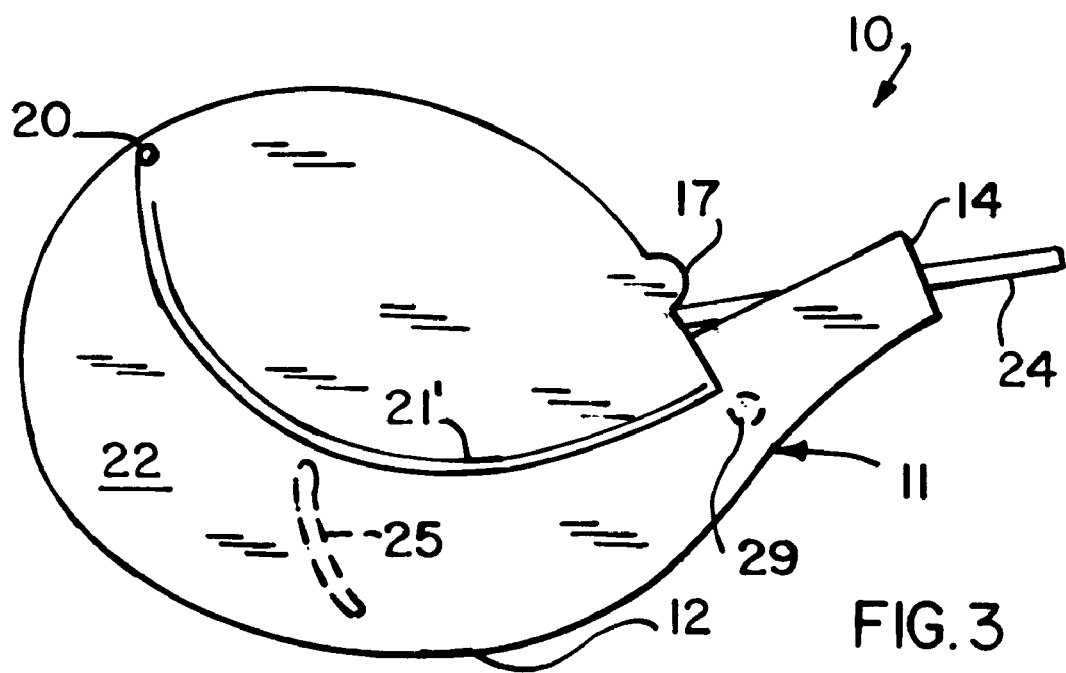
FIG. 3 is a side pictorial view of the net holder of FIG. 1 shown in a closed position enclosing a net.
Figure 4:
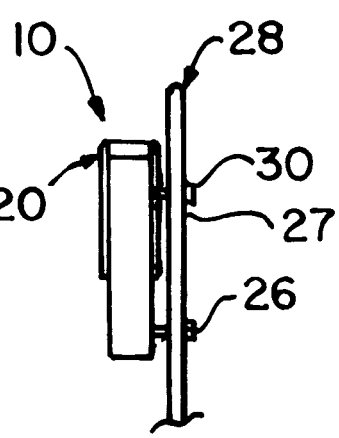
FIG. 4 is a partial pictorial view of the net holder of FIG. 1 attached to the side of a boat.

The net holder 10 is adjustably attached to the inside or outside of a gunwale 27 of a boat via attachment notch 25 and bolt 26 (FIGS. 3 and 4). The notch 25 can be formed in either side of holder 10. The holder 10 can be adjusted at an angle as desired by a user. Any other appropriate means can be used to attach holder 10 to a boat 27. A fastening hole 29 with a headed fastener 30 provides two-point securing with bolt 26.

The top section 15 is forced downwardly around hinge 20 (having spring 20') onto a net handle 24 and accordingly, a wide variety of net sizes can be accommodated inside the lower section 11 in interior space 11' with the degree of closure of upper section 15 continuously variable dependent upon the diameter of the loop (not shown) of the net. In each case, the handle 24 of a net can be secured inside notch 23 as shown in FIG. 3.

The principal purpose of the net holder 10 is to hold a net in interior spaces 11' and 15' in a manner to prevent it from becoming entangled with other apparatus in the boat 28. Accordingly, the only requirement regarding the material used in constructing the holder 10 is that it be waterproof. The holder 10 can be made of either rigid or flexible material as desired in the circumstances depending upon cost and other factors.

The holder 10 is designed for use with nets of different loop shapes whether round, oval, square, or some other shape and can be formed in such shape other than the shape illustrated if so desired.

While the invention has been described with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

What is claimed as new and what it is desired to secure by Letters Patent of the United States is:

1. A net holder for carrying a landing net having a net portion and a handle portion comprising:

an upper housing with a front and rear portion and a downwardly disposed elongated slot, a lower housing with a front and rear portion and an upwardly disposed elongated slotted opening, said upper housing includes a pair of spaced side walls each having an upper and lower edge portion and an elongate curved upper wall having a front portion with a ledge disposed adjacent a net portion and resting on a handle portion when said net holder is in a closed position and a rear portion and spaced side edge portions, said side edge portions of said upper wall being joined to said upper edge portions of said side walls, said lower housing includes a pair of spaced side walls each having an upper and lower edge portion and an elongate curved lower wall having a front portion with a single passage to secure a handle portion of a landing net therein disposed spacedly from said ledge, said single passage being deformable to permit entry of a handle portion into said passage and restrained therein and a rear portion and spaced side edge portions, said side edge portions of said lower wall being joined along said lower edge portions of said side walls of said lower portion, pivot means located adjacent said rear portions of said housings for pivotally securing said rear portions of said upper and lower housing together with a pivot axis extending through and between all said side walls, said side walls of said upper housing being spaced further apart than said side walls of said lower housing to provide for said upper housing fitting down over said lower housing when said upper housing is in a closed position, said upper housing being movable upwardly to an open position to allow a net portion of a landing net to be placed in said lower housing and being movable downwardly to said closed position over said lower housing to enclose a landing net between said upper and lower housings with a handle portion of a landing net extending through said passage and outwardly of said holder, and attaching means located on one said side wall of said lower housing to secure said net holder to a hull of a boat.

2. The net holder as defined in claim 1 wherein said pivot means for pivotally securing includes biasing means for forcing said upper housing downwardly to said closed position.

3. The net holder as defined in claim 1 wherein said attaching means including adjustment means for selectively adjusting said net holder in a plurality of positions.

4. A net holder for carrying a landing net having a net portion and a handle portion comprising:

an upper section having a pair of spaced upper side walls each including a front and rear portion, said upper side walls defining an upper interior space therebetween, a lower section having a pair of spaced lower side walls each having a front portion having a single notch therein to accommodate a handle portion of a landing net extending therethrough and rear portion, said notch being deformable to permit entry of a handle portion thereinto, said lower side walls defining a lower interior space therebetween, pivot means located adjacent said rear portions of said side walls for pivotally securing said rear portions of said sections together with a pivot axis extending through and between all said side walls, said upper section being movable upwardly to an open position to allow a net portion of a landing net to be placed in said lower interior space and being movable downwardly to a closed position to enclose a net portion of a landing net in said interior spaces with a handle portion of a landing net extending outwardly of said holder through said notch, said upper side walls of said upper section being spaced further apart than said lower side walls to provide for said upper section fitting down over said lower section when said upper section is in said closed position to provide the degree of closure of said upper section being continuously variable dependent upon the diameter of a landing net carried in said net holder, and attaching means located on one said side wall of said lower section to secure said net holder to a hull of a boat.

5. The net holder as defined in claim 4 wherein said pivot means for pivotally securing includes biasing means for forcing said upper section downwardly to said closed position.

6. The net holder as defined in claim 4 further including means for grasping said upper section for moving said upper section to said open position affixed adjacent said front portion of said upper section.

7. The net holder as defined in claim 4 wherein said front portion of said upper section has a ledge engaged with a handle portion of a landing net carried in said lower interior portion, said ledge being disposed remotely from said notch.

8. The net holder as defined in claim 4 wherein said notch includes a pair of spaced shoulders for securing a handle portion of a landing net carried in said lower portion of said lower section.

9. A net holder for carrying a landing net with a handle portion and a net portion comprising:

an upper housing formed as a channel member with a front and rear portion and a downwardly disposed opening, a lower housing formed as a channel member with a front portion having a deformable passage therein to accommodate a handle portion of a landing net extending therethrough and a rear portion and an upwardly disposed opening, pivot means located adjacent said rear portions of said housings for pivotally securing said rear portions of said upper and lower housing together with a pivot axis extending through and between both said channels, said upper housing being movable upwardly to an open position to allow a net portion of a landing net to be placed in said lower housing and being movable downwardly to a closed position to enclose a net portion of a landing net with a handle portion of a landing net extending outwardly of said holder through said passage, said upper housing including a pair of spaced side walls each having an upper and lower edge portion and an elongate upper wall having a front portion and a rear portion and spaced side edge portions, said side edge portions of said upper wall joined to said upper portions of said side walls, said lower housing including a pair of spaced side walls each having an upper and lower edge portion and an elongate lower wall having a front portion and a rear portion and spaced side edge portions, said side edge portions of said lower wall joined along said lower edge portions of said side walls, said upper housing partially and outwardly overlapping said lower housing to provide the degree of closure of said upper section being continuously variable dependent upon the diameter of a landing net carried in said net holder, and attaching means located on one said side wall of said lower housing to secure said net holder to a hull of a boat.

* * * * *